(12) United States Patent
Lyod, Jr. et al.

(10) Patent No.: US 6,932,408 B1
(45) Date of Patent: Aug. 23, 2005

(54) ADJUSTABLE FRAME WITH SEAT FOR A TRUCK BED

(76) Inventors: Louis C. Lyod, Jr., 35 W. Town Pl., Titusville, FL (US) 32780; Andrew R Loyd, 9015 Tavolini Terrance, Windemere, FL (US) 34786

( * ) Notice: Subject to any disclaimer, the term of this patent is extended or adjusted under 35 U.S.C. 154(b) by 0 days.

(21) Appl. No.: 10/800,432

(22) Filed: Mar. 15, 2004

(51) Int. Cl.$^7$ ................................................ B60N 2/00
(52) U.S. Cl. ............................. 296/63; 5/118; 224/521
(58) Field of Search ........................ 296/63, 37.6, 39.1, 296/57.1, 64, 69, 37.15, 10, 26.08, 39.2, 296/37.5; 5/118; 224/542, 403, 533, 521; 248/231.61; 108/44; 294/28

(56) References Cited

U.S. PATENT DOCUMENTS

| | | | | |
|---|---|---|---|---|
| 3,910,626 A | * | 10/1975 | Hobbensiefken | 296/69 |
| 4,005,893 A | * | 2/1977 | Tash | 294/28 |
| 4,911,493 A | * | 3/1990 | Muirhead | 296/39.2 |
| 5,029,928 A | | 7/1991 | Huber | |
| 5,139,301 A | * | 8/1992 | Lewis | 296/63 |
| 5,197,381 A | * | 3/1993 | Mells | 108/44 |
| 5,368,354 A | * | 11/1994 | Martin | 296/64 |
| 5,443,586 A | * | 8/1995 | Cargill | 296/37.5 |
| 5,501,501 A | | 3/1996 | White et al. | |
| 5,516,179 A | * | 5/1996 | Tidwell | 296/63 |
| 5,560,576 A | * | 10/1996 | Cargill | 248/231.61 |
| 5,678,743 A | * | 10/1997 | Johnson et al. | 224/521 |
| D391,086 S | | 2/1998 | Catchings | |
| 5,938,092 A | * | 8/1999 | Johnson | 224/521 |
| 5,950,890 A | * | 9/1999 | Darby | 224/403 |
| 6,116,676 A | | 9/2000 | Edwards | |
| 6,616,022 B1 | * | 9/2003 | Naastad | 224/533 |
| 6,668,397 B2 | * | 12/2003 | Olenick et al. | 5/118 |
| 6,711,762 B2 | * | 3/2004 | Olenick et al. | 5/118 |
| 2003/0140415 A1 | * | 7/2003 | Olenick et al. | 5/118 |

* cited by examiner

*Primary Examiner*—Kiran B. Patel

(57) ABSTRACT

An adjustable frame with a seat for a truck has a beam, a plate, two arms, and a seat assembly. The beam has ends, legs, and stems. The ends, the legs, and the stems have a means to adjust. The plate has a sleeve to accept the leg. The Z shaped arms have a clamp and connect to an end. The clamp connects to a lip of a truck bed. The seat assembly has necks to join the stems. The adjusting means of the stem and of the neck, of the arm and of the end, and of the leg and of the sleeve telescope to adjust the frame.

18 Claims, 4 Drawing Sheets

ADJUSTABLE FRAME WITH SEAT FOR A TRUCK BED

BACKGROUND OF THE INVENTION

1. Field of the Invention

The present invention relates to an adjustable frame with seat for use in connection with motor vehicles. The adjustable frame with seat has particular utility in connection with truck beds of various sizes.

2. Description of the Prior Art

Once the domain of contractors, farmers, and ranchers, pickup trucks have caught the interest of the public. Besides hauling, people have pickup trucks for utility vehicles and basic transportation. With two or three seats in the cab, pickup trucks may take additional passengers in the truck bed at the pickup truck owner's discretion. However, passengers in the truck bed face known and significant dangers of ejection and other bodily injury in an accident. Most pickup truck owners refrain from installing seats in the truck bed due to reduced cargo capacity, inconvenience, and cost.

Truck beds have a floor, often corrugated, sides, and a tailgate. Some pickup truck owners install seats for their passengers upon the floor and within the truck bed. These permanent seats occupy nearly one third of the cargo space. Should the pickup truck owner wish to haul cargo, the pickup truck owner must remove and reinstall seats. Adjustable frames with a seat for a truck bed are desirable for secure but removable seats in a truck bed.

The use of truck bed seats is known in the prior art. For example, U.S. Pat. No. 5,516,179 to Tidwell discloses a truck bed seat that folds upon a two-rail frame. However, the Tidwell '179 patent does not clamp to the sides of truck bed, and has further drawbacks of permanent bolting to the truck bed.

U.S. Pat. No. 5,368,354 to Martin discloses a pickup bed cap having passenger seat that covers an entire truck bed. However, the Martin '354 patent does not have a frame for the seat, and additionally does not adjust the seat vertically or side to side within the truck bed.

Similarly, U.S. Pat. No. 5,029,928 to Huber discloses a pickup truck bed seat that folds and detaches from a truck. However, the Huber '928 patent does not have a frame to support the seat, and cannot adjust the elevation of the seat above the floor of a truck bed.

Similarly, U.S. Pat. No. Des. 391,086 to Catchings et al. discloses a vehicle seat that attaches to a truck bed. However, the Catchings '086 patent does not have a frame, and cannot adjust the position of the seat once bolted to the truck bed.

Similarly, U.S. Pat. No. 5,501,501 to White et al. discloses a truck bed detachable seat assembly that folds and attaches to a truck bed floor. However, the White '501 patent does not mount a seat above the truck bed floor, and cannot clamp to a truck bed lip.

Lastly, U.S. Pat. No. 6,116,676 to Edwards discloses a folding tailgate seat that has a hook over the tailgate. However, the Edwards '676 patent does not have a frame to support the seat, and has the additional deficiency of no adjustment of position of the seat.

While the above-described devices fulfill their respective, particular objectives and requirements, the aforementioned patents do not describe an adjustable frame with seat for a truck bed that fits truck beds of various sizes. The Tidwell '179 patent makes no provision for removably clamping a seat to a truck bed. While the Martin '354 patent omits a frame to support the seat. The Huber '928, Catchings '086, and Edwards '676 patents make no provision to adjust the position of the seat within a truck bed. Then the White '501 patent makes no provision for attaching a seat to the truck bed lip.

Therefore, a need exists for a new and improved adjustable frame with seat for a truck bed that can be used for truck beds of various sizes. In this regard, the present invention substantially fulfills this need. In this respect, the adjustable frame with seat for a truck bed according to the present invention substantially departs from the conventional concepts and designs of the prior art, and in doing so provides an apparatus primarily developed for the purpose of truck beds of various sizes.

SUMMARY OF THE INVENTION

In view of the foregoing disadvantages inherent in the known types of truck bed seats now present in the prior art, the present invention provides an improved adjustable frame with seat for a truck bed, and overcomes the above-mentioned disadvantages and drawbacks of the prior art. As such, the general purpose of the present invention, which will be described subsequently in greater detail, is to provide a new and improved adjustable frame with seat for a truck bed and method which has all the advantages of the prior art mentioned heretofore and many novel features that result in an adjustable frame with seat for a truck bed which is not anticipated, rendered obvious, suggested, or even implied by the prior art, either alone or in any combination thereof.

To attain this, the present invention essentially comprises an adjustable frame with a seat, typically used in a truck bed, that has a beam, a plate, two arms connected to the beam, and a seat assembly. The beam has two opposite ends, one or more legs hanging beneath the beam, and one or more stems extending above the beam opposite the leg. The ends, the legs, and the stems have a means to adjust. The plate has a generally rectangular shape and a centered sleeve perpendicular to the plate. The sleeve accepts the leg and has the adjusting means. The plate rests upon a truck bed and the adjusting means of the leg and the sleeve telescope to permit changing the elevation of the beam relative to the truck bed. The two arms have a generally Z shape, a lower sleeve with the adjusting means, a web perpendicular to the lower sleeve, and an upper sleeve with a clamp. The lower sleeve connects to the end of the beam and the adjusting means of the arm and of the end telescope to permit changing the width of the adjustable frame. The clamp connects to a lip of a truck bed while allowing removal of the beam. The seat assembly has a generally L shape suitable for a seated person, one or more seat belts, and one or more necks hanging beneath the seat assembly to connect with the stems. The adjusting means of the stem and of the neck telescope to permit changing the elevation of the seat assembly relative to the beam.

There has thus been outlined, rather broadly, the more important features of the invention in order that the detailed description thereof that follows may be better understood and in order that the present contribution to the art may be better appreciated.

The invention may also have an adjusting means in the form of a locking pin and cooperating holes, arms with C clamps having screws between clamp jaws, square or round tubing for the frame, and a seat assembly in bench or single seat form. Additional features of the invention will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved adjustable frame with seat for a truck bed that has all of the advantages of the prior art truck bed seats and none of the disadvantages.

It is another object of the present invention to provide a new and improved adjustable frame with seat for a truck bed that may be easily and efficiently manufactured and marketed.

An even further object of the present invention is to provide a new and improved adjustable frame with seat for a truck bed that has a low cost of manufacture with regard to both materials and labor, and which accordingly is then susceptible of low prices of sale to the consuming public, thereby making such adjustable frame with seat for a truck bed economically available to the buying public.

Still another object of the present invention is to provide a new adjustable frame with seat for a truck bed that provides in the apparatuses and methods of the prior art some of the advantages thereof, while simultaneously overcoming some of the disadvantages normally associated therewith.

Even still another object of the present invention is to provide an adjustable frame with seat for a truck bed for truck beds of various sizes. This allows a frame and seat to adjust vertically and horizontally within a truck bed to fit vehicles of various sizes.

Still yet another object of the present invention is to provide an adjustable frame with seat for a truck bed for truck beds of various sizes. This makes it possible to enhance passenger safety.

Still yet another object of the present invention is to provide an adjustable frame with seat for a truck bed for truck beds of various sizes. This makes it possible to remove seats for transporting cargo.

Lastly, it is an object of the present invention to provide a new and improved method of installing seats in a truck bed, with these steps: 1) putting a plate upon a truck bed, 2) inserting a leg of the beam into a sleeve extending from the plate, 3) placing an arm loosely upon each end of a beam, 4) tightening clamps of each arm upon the lip of the truck bed thereby fixing the beam within the truck, bed, and 5) positioning one or more seats upon stems extending from the beam opposite the leg.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
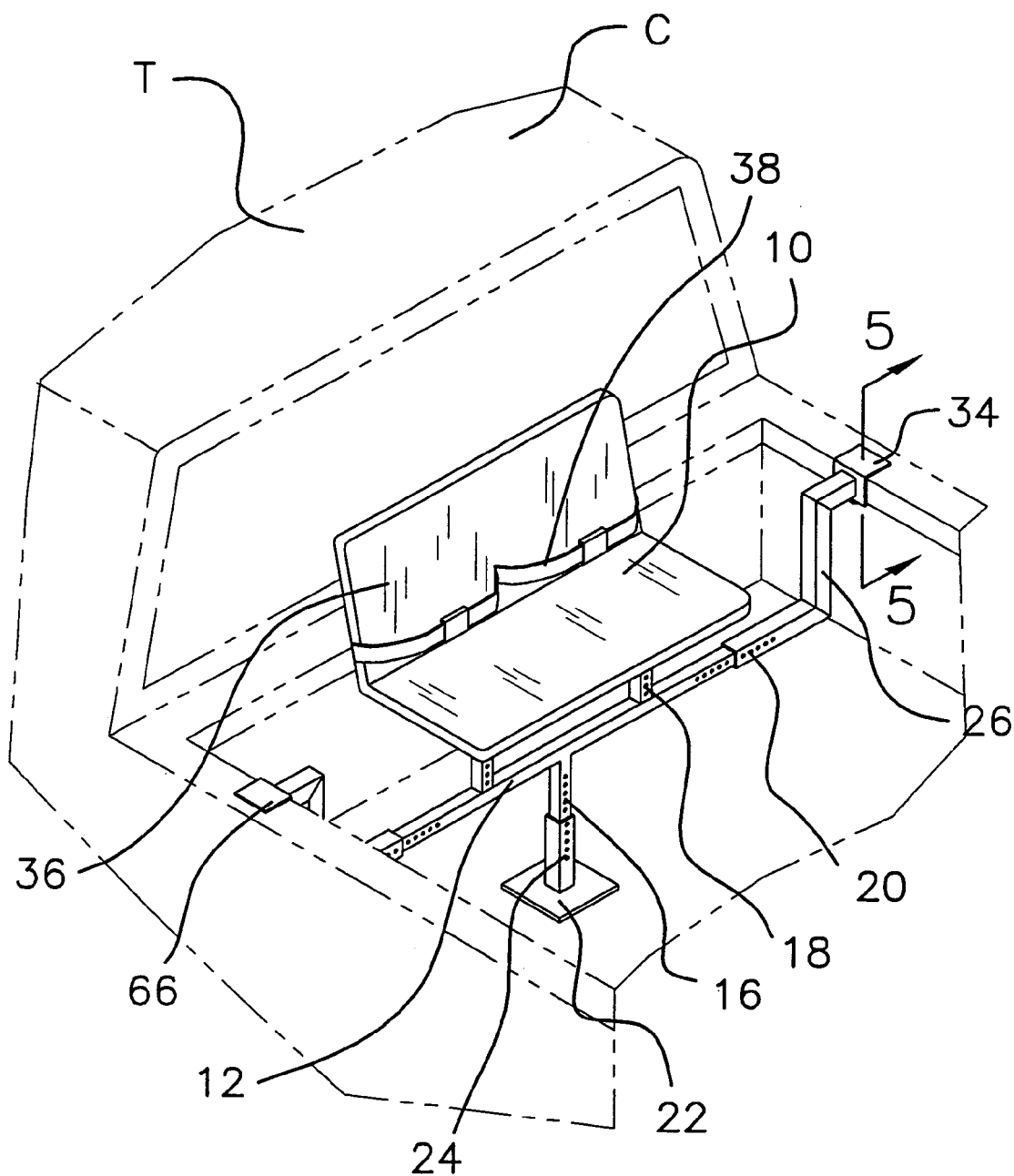
FIG. 1 is an oblique view of the preferred embodiment of the adjustable frame with seat for a truck bed constructed in accordance with the principles of the present invention.

Referring now to the drawings, and particularly to FIGS. 1–5, a preferred embodiment of the adjustable frame with seat for a truck bed of the present invention is shown and generally designated by the reference numeral 10.

In FIG. 1, a new and improved adjustable frame with seat for a truck bed 10 of the present invention for truck beds of various sizes is illustrated and will be described. Pickup trucks T have a cab C in the front and a bed B in the rear. The driver and passengers ride in the cab C however, drivers permit passengers to ride in the bed B. More particularly, the adjustable frame with seat for a truck bed 10 has a beam 12 to span across the truck T bed B. The beam 12 has two opposite ends 14, each end 14 having means to adjust 20. Beneath the beam 12, a leg 16 depends 14 typically from the center of the beam 12. The leg 16 has adjusting means 20. Flanking the leg 16, two stems 18 extend 14 above the beam 12, regularly spaced and mutually parallel, and have adjusting means 20. A plate 22 rests upon the floor of the truck T bed B and has a centered sleeve extending perpendicular to the plate 22 with adjusting means 20. The sleeve 24 accepts the leg 16, securing the beam 12 to the floor. Flanking the beam 12, two arms 26 have a means to secure 66 the beam 12 within the sides of the truck T bed B. An arm 26 accepts an end 14 of the beam 12 and removably joins the lip L of the truck T bed B. With the adjustable frame with seat for a truck T bed B 10 positioned and secured within the truck T bed B, a seat assembly 36 joins the stems 18. The seat assembly 36 has a generally L shape for persons to sit upon, seat belts 38, and a width for one or more persons. FIG. 1 shows a bench style seat joining the two stems 18. In the preferred embodiment, the beam 12, ends 14, leg 16, and stems 18 are square tube steel and the arms 26 and sleeve are square tube steel of slightly larger width to accept the leg 16 and the ends 14.

Figure 2:
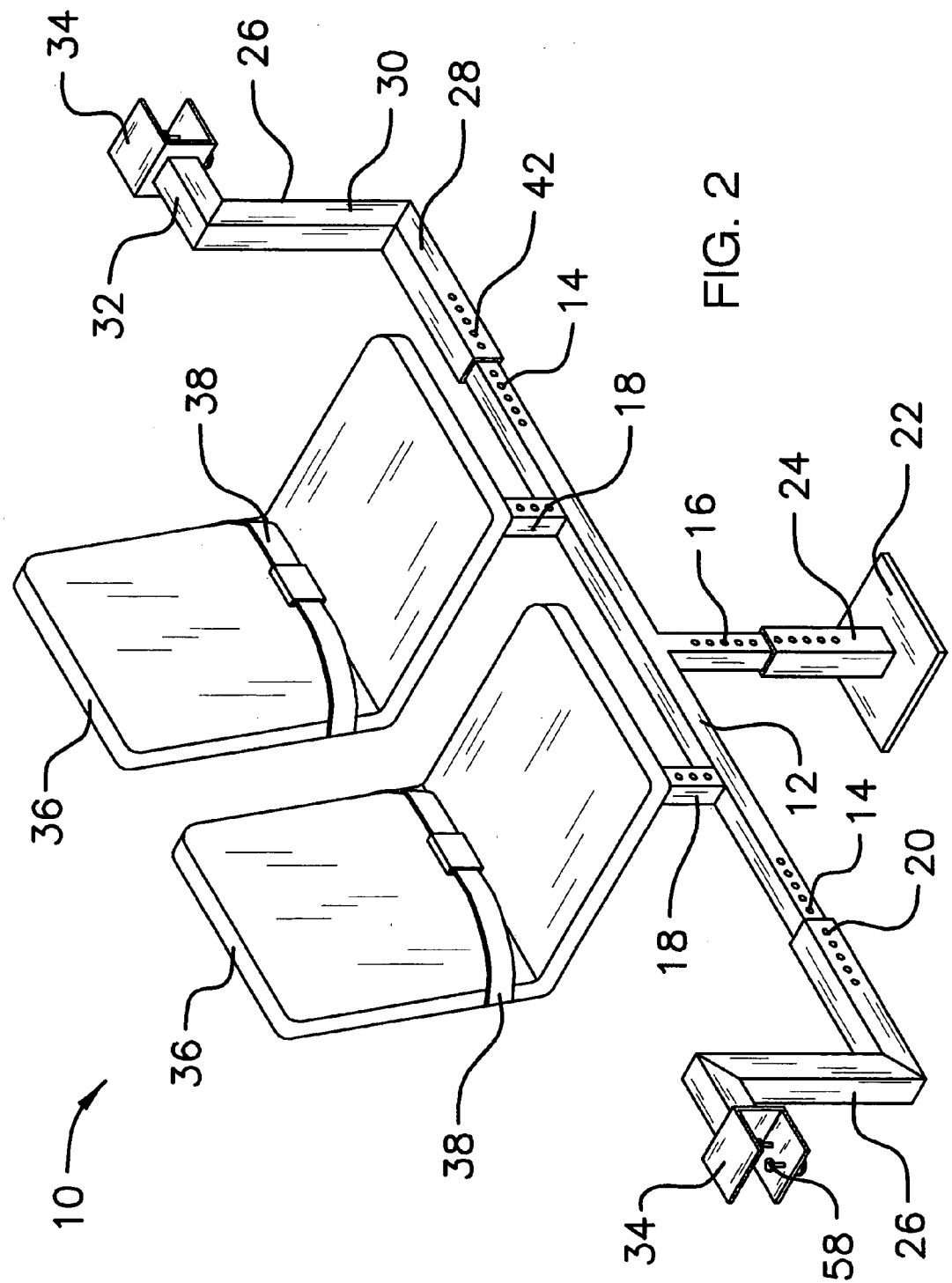
FIG. 2 is an oblique view of the adjustable frame with seat for a truck bed of the present invention with two seats and truck bed not shown.

FIG. 2 shows the adjustable frame with seat for a truck T bed B 10 separate from a truck T. Incorporating FIG. 1 by reference, FIG. 2 describes the adjusting means 20 as holes 42 on the leg 16 and ends 14 that cooperate with holes 42 in the sleeve and arms 26 respectively. A driver adjusts the elevation of the beam 12 from the floor of the truck T bed B by positioning the leg 16 within the sleeve. Next, a driver locates the beam 12 within the sides of a truck T bed B by positioning the ends 14 within the arms 26. Each arm 26 has a generally Z shape with a lower sleeve 28 running horizontal and parallel to the floor of the truck T bed B, a web 30 perpendicular to the lower sleeve 28 and joined to one end 14 of the lower sleeve 28, and an upper sleeve 32 running horizontal and parallel to the floor of the truck T bed B. The upper sleeve 32 extends 14 from the web 30 and ends 14 in a securing means 66 called a clamp 34. The clamp 34 has a generally C shape and one or more screws 58. The clamp 34 fits around the lip L of the truck T bed B and the screws 58 grip the lip L to secure the arms 26 and the beam 12 into the truck T bed B. FIG. 2 also shows an alternate embodiment of the seat assembly 36: a single seat with seat belt 38 attached to one or both stems 18. The single seats have a generally L shape for one person to sit upon.

Figure 3:
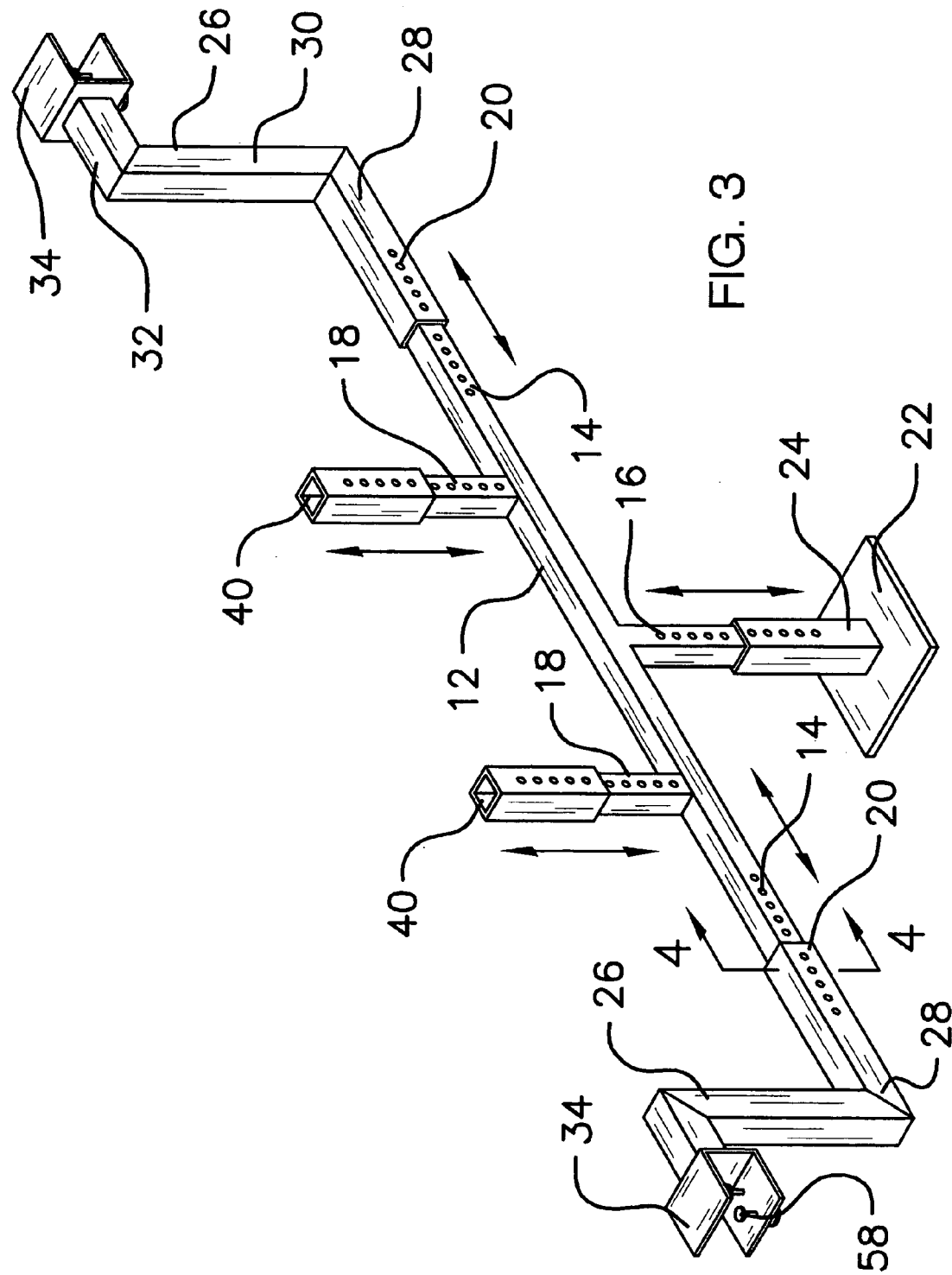
FIG. 3 is an oblique view of the adjustable frame with seat for a truck bed of the present invention without seat assembly and truck bed not shown.

Removing the seat assembly 36 from view, FIG. 3 shows the adjustments and axes of movement for the adjustable frame with seat for a truck T bed B 10. The beam 12 raises and lowers relative to the floor of the bed B by telescoping the leg 16 within the sleeve of the plate 22. The beam 12 moves left or right relative to the sides of the truck T bed B by telescoping the ends 14 of the beams 12 within the lower sleeves 28 of the arms 26. Beneath the seat assembly 36, one or more necks 40 depend 14 from the seat assembly 36 itself. The necks 40 are square tube steel of slightly larger width to accept the stems 18. The necks 40 have holes 42 to cooperate with the holes 42 in the stems 18. The seat assembly 36 raises and lowers relative to the beam 12 by telescoping the stem 18 within the neck 40. The lower sleeves 28 and ends 14, necks 40 and stems 18, and leg 16 and sleeve each have the adjusting means 20 of cooperating holes 42. The holes 42 extend 14 perpendicular to the longitudinal axes of the lower sleeves 28 and ends 14, necks 40 and stems 18, and leg 16 and sleeve respectively.

Figure 4:
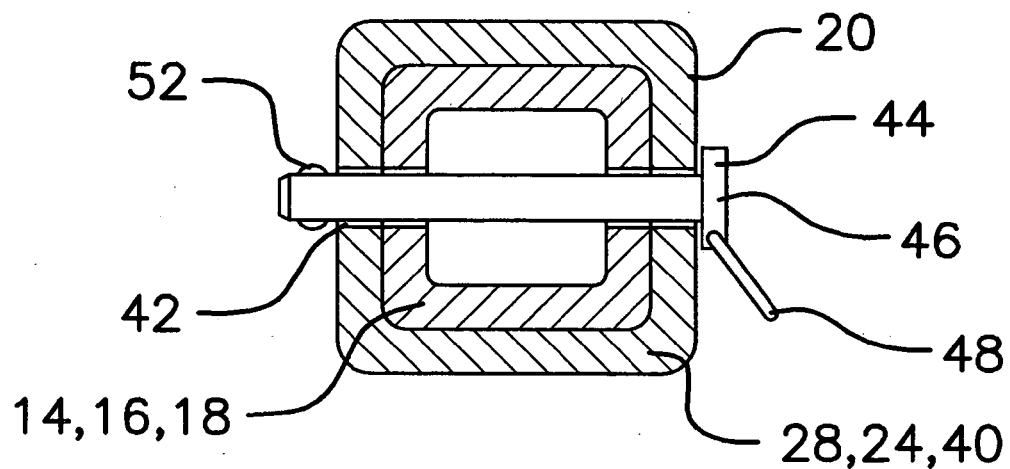
FIG. 4 is a detailed view of the locking pin cooperating with holes of the adjustable frame with seat for a truck bed of the present invention.

FIG. 4 illustrates the adjusting means 20 more closely. The lower sleeves 28, necks 40, and sleeve admit the ends 14, stems 18, and leg 16 respectively along the longitudinal axis. To secure the lower sleeves 28, necks 40, and sleeve and the ends 14, stems 18, and leg 16 respectively, a removable locking pin 44 prevents movement of the adjusting means 20 when inserted into holes 42. The locking pin 44 has a cap 46 with a pull ring 48, a cylindrical shaft 50 extending from the cap 46, and one or more bearings 52 perpendicular from the shaft 50 opposite the cap 46. The shaft 50 has sufficient length to pass through lower sleeves 28, necks 40, and sleeve and the ends 14, stems 18, and leg 16 respectively. The bearings 52 extend 14 from the shaft 50 to prevent inadvertent removal of the locking pin 44. A driver may remove the locking pin 44 deliberately to adjust the beam 12 upon an axis of movement. Each lower sleeve 28 and end 14, each neck 40 and stem 18, and the leg 16 and sleeve 24 have a locking pin 44. In the preferred embodiment, the locking pin 44 is solid steel.

Figure 5:
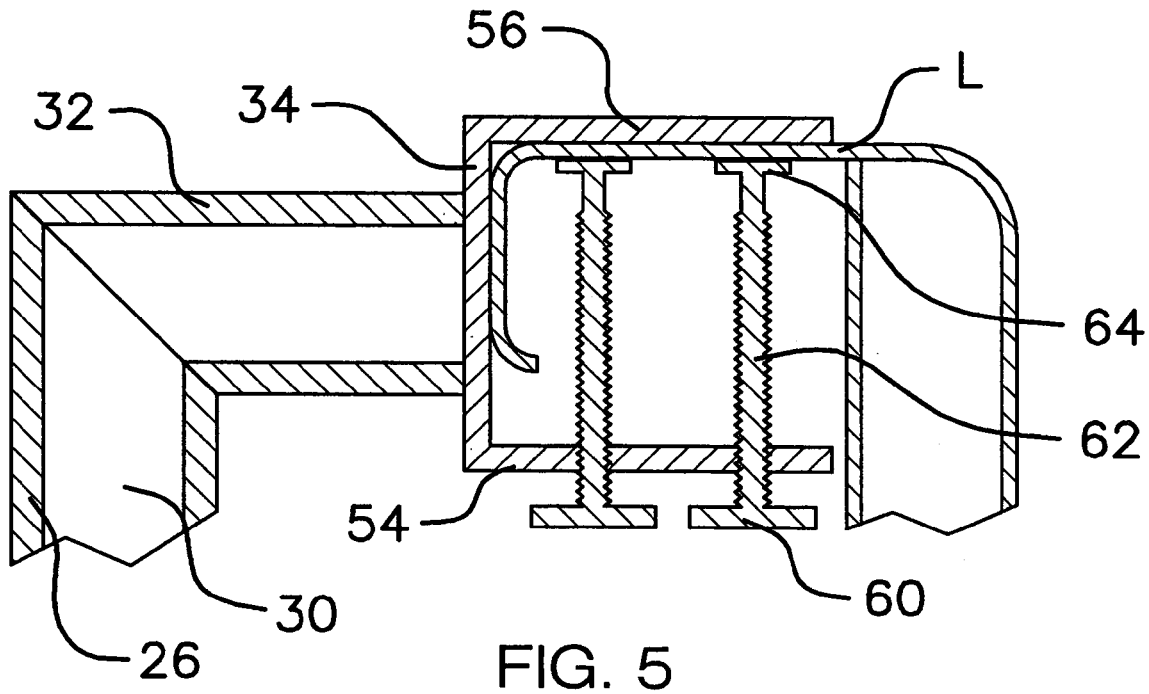
FIG. 5 is a detailed view of the adjustable frame with seat for a truck bed of the present invention showing the clamp to a lip of the truck bed.

With the locking pins 44 fixing the adjustable frame with seat for a truck T bed B 10 itself, FIG. 5 describes more closely the clamp 34 and lip L connection. The clamp 34 has a lower jaw 54 and an upper jaw 56 with one or more screws 58 extending from the lower jaw 54 to the upper jaw 56. The clamp 34 fits around the lip L of the truck T bed B with the upper jaw 56 on top of the lip L and the lower jaw 54 beneath the lip L. The screws 58 pass through the lower jaw 54, contact under the lip L, and compress the lip L to the upper jaw 56. The screws 58 have a head 60 suitable for manual gripping, a threaded shaft 62 extending from the head 60, and a foot 64 upon the shaft 50 opposite the head 60 suitable for contacting the lip L.

In use, it can now be understood that a driver places a plate 22 centered in a truck T bed B. The driver then inserts a leg 16 of the adjustable frame with seat for a truck T bed B into the sleeve 24 extending from the plate 22. The driver next places the lower sleeves 28 of the arms 26 at each end 14 of the beam 12 then secures the clamps 34 to the lips L of the truck T bed B. Adjusting the clamps 34 slightly if needed, the driver inserts locking pins 44 between the sleeve 24 and leg 16, and each arm 26 and end 14 to secure the adjustable frame with seat for a truck T bed B. Lastly, the driver places the necks 40 of the seat assembly 36 into the stems 18 and fixes the elevation of the seat assembly 36 by inserting locking pins 44 between the necks 40 and stems 18. A driver would remove the adjustable frame with seat for a truck T bed B by performing these steps in reverse.

While a preferred embodiment of the adjustable frame with seat for a truck bed has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, composite, or a metal alloy may be used instead of the steel tubing described. Also, the clamps may permanently connect to holes in the lip included by the truck manufacturer. Although truck beds of various sizes have been described, it should be appreciated that the adjustable frame with seat for a truck bed herein described is also suitable for trailers and boats. Furthermore, a wide variety of adjusting means may be used instead of the locking pin described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An adjustable frame with seat typically used in a truck bed, comprising:
   a beam having two opposite ends, one or more legs depending from said beam, one or more stems extending from said beam opposite said leg, said ends, said legs, and said stems having means to adjust;
   a plate having a generally rectangular shape and a centered sleeve perpendicular to said plate, said sleeve accepts said leg and has said adjusting means, whereby said plate rests upon a truck bed and said adjusting means of said leg and of said sleeve cooperate to permit changing the elevation of said beam relative to the truck bed;

two arms having a generally Z shape, a lower sleeve with said adjusting means, a web perpendicular to said lower sleeve, and an upper sleeve having a clamp, said lower sleeve connects to said end of said beam, said clamp connects to a lip of a truck bed whereby, said adjusting means of said arm and of said end cooperate to permit changing the width of said adjustable frame; and, a seat assembly having a generally L shape suitable for a seated person, one or more seat belts, and one or more necks depending from said assembly to connect with said stems whereby said adjusting means of said stem and of said neck cooperate to permit changing the elevation of said seat assembly relative to said beam.

2. The adjustable frame with seat of claim 1 further comprising:

said adjusting means having a plurality of holes perpendicular to the longitudinal axes of said ends, said legs, said stems, said sleeve, said lower sleeve and said necks, whereby said holes of said sleeve, said lower sleeve, and said necks align with said holes of said legs, said ends, and said stems; and, a locking pin, having a cap with a pull ring, said cap of greater width than said holes of said adjusting means, a shaft extending from said cap, and one or more bearings extending perpendicular to said shaft opposite said cap;

whereby, said locking pin is inserted through cooperating holes in said sleeve, said lower sleeves, and said necks then through cooperating holes in said leg, said ends, and said stems respectively to adjust the positions of said arms, said seat assembly, and said leg relative to a truck bed.

3. The adjustable frame with seat of claim 2 further comprising:

said clamp having a generally C shape with a lower jaw and an opposite upper jaw, and one or more screws extending from said lower jaw to said upper jaw.

4. The adjustable frame with seat of claim 3 wherein said screw has a head suitable for manual gripping, a threaded shaft, and a foot opposite said head suitable for mating with a lip of a truck bed thus said adjustable frame is secured by said clamps within a truck bed.

5. The adjustable frame with seat of claim 4 wherein said ends, said legs, and said stems are hollow tubing and said arms, said sleeves, said lower sleeves, and said necks are hollow tubing of slightly larger width so that said ends, said leg, and said stems telescope within said sleeves, said lower sleeves, and said necks respectively.

6. The adjustable frame with seat of claim 5 wherein hollow tubing is square in cross section on a plane perpendicular to the length of said tubing.

7. The adjustable frame with seat of claim 5 wherein hollow tubing is round in cross section on a plane perpendicular to the length of said tubing.

8. The adjustable frame with seat of claim 5 wherein said seat assembly is a bench for two seated persons with two depending necks centered beneath the seats of each person for connecting with said stems.

9. The adjustable frame with seat of claim 5 wherein said seat assembly is one or more separate seats each with a depending neck centered beneath said seat for connecting with said stems.

10. An adjustable frame with seat typically used in a truck bed, comprising:

a beam having two opposite ends, one or more legs depending from said beam, one or more stems extending from said beam opposite said leg, said ends, said legs, and said stems having means to adjust;

two arms having a generally Z shape, a lower sleeve with said adjusting means, a web perpendicular to said lower sleeve, and an upper sleeve having a means to secure to the lip of a truck bed, said lower sleeve connects to said end of said beam whereby said adjusting means of said arm and of said end cooperate to adjust the width of said adjustable frame;

a plate having a generally rectangular shape and a centered sleeve perpendicular to said plate that accepts said leg and has said adjusting means, whereby said plate rests upon a truck bed and said adjusting means of said leg and of said sleeve cooperate to adjust the elevation of said beam relative to the truck bed;

a seat assembly having a generally L shape suitable for a seated person, one or more seat belts, and one or more necks depending from said assembly to connect with said stems whereby said adjusting means of said stem and said neck cooperate to adjust the elevation of said assembly relative to said beam.

11. The adjustable frame with seat of claim 10 further comprising:

said adjusting means having a plurality of holes perpendicular to the longitudinal axis of said ends, said legs, said stems, said sleeve, said lower sleeve and said necks; and, a locking pin, having a cap with a pull ring, a shaft extending from said cap, and one or more bearings extending perpendicular to said shaft opposite said cap;

whereby, said locking pin is inserted through cooperating holes in said sleeve, said lower sleeves, or said necks through cooperating holes in said leg, said ends, or said stems respectively to adjust the positions of said arms, said seat assembly, and said leg within a truck bed.

12. The adjustable frame with seat of claim 11 wherein said securing means is a clamp having a generally C shape with a lower jaw and an opposite upper jaw, and one or more screws extending from said lower jaw to said upper jaw.

13. The adjustable frame with seat of claim 12 wherein said screw has a head suitable for manual gripping, a threaded shaft, and a foot opposite said head suitable for mating with lip of a truck bed whereby, said adjustable frame is secured by said clamp upon each arm within the sides of a truck bed.

14. The adjustable frame with seat of claim 13 wherein said ends, said legs, and said stems are hollow tubing that fit within the hollowing tubing of said arms, said sleeves, said lower sleeves, and said necks respectively.

15. The adjustable frame with seat of claim 14 wherein the cross section of said hollow tubing is selected from the group comprising round or square.

16. The adjustable frame with seat of claim 14 wherein said seat assembly is a bench for two seated persons with two depending necks centered beneath the seats of each person for connecting with said stems.

17. The adjustable frame with seat of claim 14 wherein said seat assembly is one or more individual seats each with a depending neck centered beneath said seat for connecting with said stems.

18. A method of installing seating in a truck bed, the steps comprising:
- putting a base upon a truck bed; and,
- inserting a leg of said beam into a sleeve extending from said base; and,
- placing an arm loosely upon each end of a beam; and,
- tightening clamps of each arm upon the lip of said truck bed thereby fixing said beam within said truck bed; and,
- positioning one or more seats upon stems extending from said beam opposite said leg.

* * * * *